United States Patent [19]
Koch

[11] Patent Number: 5,369,985
[45] Date of Patent: Dec. 6, 1994

[54] SEALING ELEMENT FOR THE ENDS OF ROD-SHAPED ARTICLES OF THE TOBACCO PROCESSING INDUSTRY

[75] Inventor: Franz-Peter Koch, Schwarzenbek, Germany

[73] Assignee: Körber AG, Hamburg, Germany

[21] Appl. No.: 160,493

[22] Filed: Dec. 1, 1993

[30] Foreign Application Priority Data

Dec. 11, 1992 [DE] Germany ............... 4241798

[51] Int. Cl.⁵ .............. G01M 3/04; G01M 3/26; G01M 15/08
[52] U.S. Cl. ................. 73/49.8; 131/904; 131/906; 73/37
[58] Field of Search .............. 131/904, 906; 73/49.8, 73/37, 38

[56] References Cited

U.S. PATENT DOCUMENTS

| | | | |
|---|---|---|---|
| 3,237,444 | 3/1966 | Kaeding et al. | 73/45.1 |
| 3,339,402 | 9/1967 | Rudszinat | 73/41 |
| 3,386,281 | 6/1968 | Menge et al. | 73/41 |
| 3,769,832 | 11/1973 | Baier | 73/41 |
| 3,962,906 | 6/1976 | Heitmann et al. | 73/41 |
| 4,171,635 | 10/1979 | Calleson et al. | 73/38 |
| 4,429,567 | 2/1984 | Koch et al. | 73/49.8 |
| 4,528,841 | 7/1985 | Siems | 73/38 |
| 4,630,466 | 12/1986 | Berlin | 73/38 |
| 4,888,977 | 12/1989 | Chehab et al. | 73/38 |

Primary Examiner—Hezron E. Williams
Assistant Examiner—J. David Wiggins
Attorney, Agent, or Firm—Darby & Darby

[57] ABSTRACT

A sealing element for use in the testing of cigarettes or other rod-shaped articles of the tobacco processing industry has an elastic tubular body with an end portion having an axially movable end wall and an annular lip extending beyond the external surface of the end wall. The latter has a central opening constituting the inlet or the outlet of an axial passage for testing fluid. When the end of an article to be tested is caused to bear against the external surface of the end wall, the latter yields axially of the tubular body and causes the lip to flex radially inwardly into engagement with the periphery of the adjacent end of the article to be tested. In order to reduce the likelihood of damage to the end wall and/or the lip by sharp edges surrounding the ends of certain articles which are caused to bear against the external surface of the end wall, such external surface is provided with an annular recess which is inwardly adjacent the lip and can have a substantially semicircular cross-sectional outline.

10 Claims, 1 Drawing Sheet

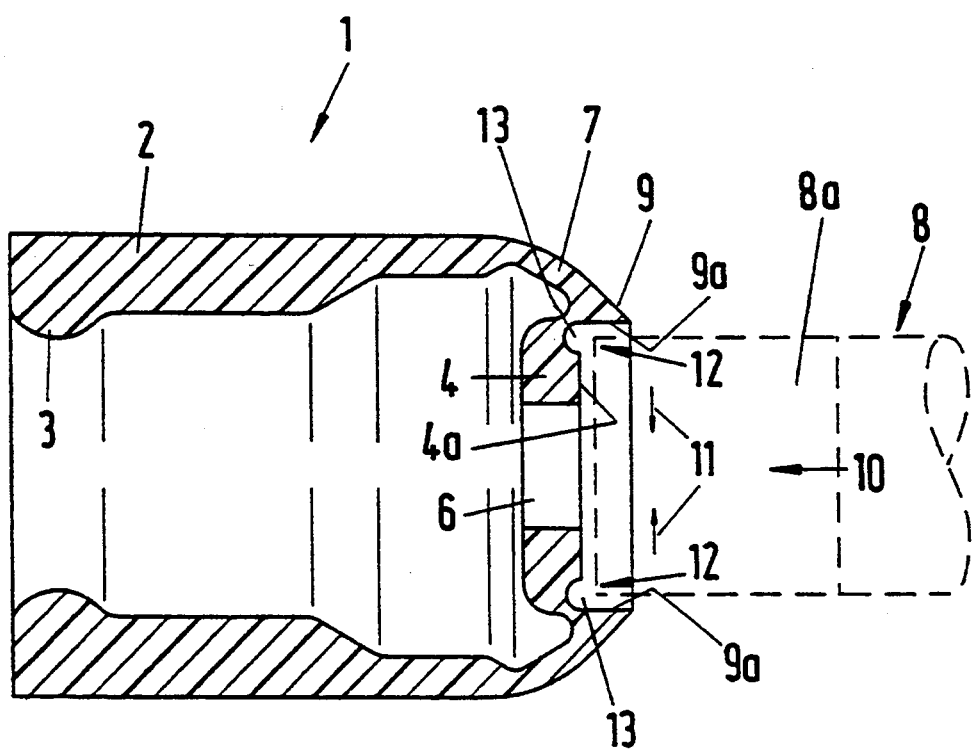

SEALING ELEMENT FOR THE ENDS OF ROD-SHAPED ARTICLES OF THE TOBACCO PROCESSING INDUSTRY

BACKGROUND OF THE INVENTION

The invention relates to improvements in apparatus for testing rod-shaped articles of the tobacco processing industry, and more particularly to improvements in sealing elements which are utilized in such apparatus to convey a testing fluid (for example, atmospheric air) from a fluid source into an end of an article to be tested or from an article to be tested to a monitoring device for testing fluid. Still more particularly, the invention relates to improvements in sealing devices of the type disclosed in commonly owned U.S. Pat. No. 4,429,567 granted Feb. 7, 1984 to Koch et al. for "Apparatus for testing cigarettes or the like". The disclosure of this patent is incorporated herein by reference.

The patent to Koch et al. discloses sealing elements wherein an end wall of a tubular body of elastomeric material has an opening and can be engaged by the end face of an article to be tested so that a testing fluid can flow from the interior of the tubular body into the article or in the opposite direction. The external surface of the end wall is surrounded by an annular elastic lip which is flexed radially inwardly against the peripheral surface of the article to be tested while the end face of such article bears against the end wall, i.e., in response to inward displacement of the end wall by the article to be tested. A drawback of presently known sealing elements is that their useful life is rather short, often because the relatively sharp edges of tubular wrappers of articles which are caused to bear against the external surface of the end wall are likely to cut into and/or otherwise damage the end wall and/or the surrounding lip.

OBJECTS OF THE INVENTION

An object of the invention is to provide a sealing element which can be used in apparatus for testing plain or filter cigarettes, cigars, cigarillos, cheroots, filter rod sections and/or other rod-shaped articles of the tobacco processing industry and whose useful life is longer than that of heretofore known sealing elements even though it is, or can be, made of the same material as conventional sealing elements.

Another object of the invention is to provide a sealing element wherein the portion which is engageable with an article to be tested is less likely to be damaged by articles than in heretofore known sealing elements.

A further object of the invention is to provide a sealing element which exhibits the above outlined advantages and can be installed in existing testing apparatus as a superior substitute for conventional sealing elements.

Still another object of the invention is to provide a novel and improved transition zone between the end wall and the lip of the above outlined sealing element.

An additional object of the invention is to provide a testing apparatus which employs sealing elements of the above outlined character.

A further object of the invention is to provide a simple and inexpensive sealing element which can be mass-produced in available machines.

Another object of the invention is to provide the above outlined sealing element with a novel and improved end wall.

An additional object of the invention is to provide a novel and improved method of prolonging the useful life of sealing elements of the type disclosed in commonly owned U.S. Pat. No. 4,429,567 to Koch et al.

Still another object of the invention is to provide the above outlined sealing element with a novel and improved article-contacting end portion.

A further object of the invention is to provide a sealing element which can be caused to establish a reliable seal along the ends of a long series of successively tested rod-shaped articles of the tobacco processing industry.

SUMMARY OF THE INVENTION

The invention resides in the provision of an element which can be used to sealingly engage the ends of plain or filter cigarettes, cigars, cigarillos, cheroots, sections of filter rods or other rod-shaped articles of the tobacco processing industry during testing of articles with air or another testing fluid. The improved sealing element comprises a substantially tubular body (e.g., an elongated tubular body having a cylindrical peripheral surface) including an end portion having an end wall with an external surface engageable by the end of an article to be tested and an annular lip surrounding and extending beyond the external surface of the end wall. The tubular body has an elongated fluid conveying passage including at least one opening in the end wall, and such end wall is movable into the passage in response to engagement of the external surface by the end of an article to be tested. The lip is deformable toward and into sealing engagement with the end of the article in response to movement of the end wall by the end of the article. The end portion of the tubular body is provided with an annular recess which is machined into or is otherwise formed in the external surface adjacent the lip.

The at least one opening can be disposed substantially centrally of the end wall so as to be spacedly surrounded by the recess.

The tubular body is or can be elongated and has a longitudinally extending axis. The end wall is movable in the direction of such axis and the lip is deformable substantially radially of and toward the axis.

The recess can have a substantially semicircular cross-sectional outline. Such recess can have a predetermined depth, and the lip can extend beyond the external surface of the end wall through a predetermined distance greater than the predetermined depth.

At least the lip of the end portion of the tubular body contains or consists of an elastic material. Such material can be selected from the group consisting of natural rubber and elastomers (e.g., silicone rubber). In many instances, the entire tubular body will be made of an elastomeric material.

The at least one opening can constitute an inlet or an outlet of the passage in the tubular body, i.e., the testing fluid can be caused to flow from the end of an article being tested into the opening or in the opposite direction.

The novel features which are considered as characteristic of the invention are set forth in particular in the appended claims. The improved sealing element itself, however, both as to its construction and the mode of making and using the same, together with additional features and advantages thereof, will be best understood upon perusal of the following detailed description of certain presently preferred specific embodiments with reference to the accompanying drawing.

BRIEF DESCRIPTION OF THE DRAWING

The single FIGURE of the drawing is a greatly enlarged longitudinal axial sectional view of a sealing element which embodies one form of the invention, a portion of a rod-shaped article to be tested being indicated by broken lines in a position preparatory to the establishment of sealing engagement with the lip of the tubular body of the sealing element.

DESCRIPTION OF PREFERRED EMBODIMENTS

The sealing element 1 which is shown in the drawing comprises an elongated tubular body 2 of an elastic material, e.g., natural rubber or an elastomer (such as silicone rubber). The left-hand end portion of the tubular body is provided with a circumferentially complete internal rib 3 which can enter a socket in the external surface of a suitable metallic or plastic support, e.g., in a manner as shown in the aforementioned patent to Koch et al. The illustrated tubular body 2 is an elongated cylinder having a largely cylindrical peripheral surface and a novel and improved right-hand end portion 7 including a transversely extending end wall 4 and an annular lip 9 which surrounds and extends outwardly (i.e., to the right, as viewed in the drawing) beyond the external surface 4a of the end wall 4.

The central portion of the end wall 4 is provided with a circular opening 6 which permits the flow of a testing fluid 10 in a direction from the interior of the article 8 to be tested (e.g., a filter cigarette having a filter plug 8a) into the axially extending passage within the tubular body 2 or in the opposite direction. The stream of testing fluid 10 can constitute a flow of compressed air which is admitted into the other (non-illustrated) end of the cigarette 8 and is to be conveyed to a suitable pressure monitoring device receiving testing fluid (if any) from the left-hand end of the passage in the tubular body 2. If the wrapper of the article 8 is overly porous or has frayed ends, one or more holes and/or an open seam, the testing fluid escapes through the defective wrapper into the surrounding atmosphere and the pressure of testing fluid 10 entering the tubular body 2 in the course of a testing operation is lower than the pressure of fluid entering the other end of the cigarette 8. Such pressure drop is monitored and the monitoring device generates a signal which is evaluated to ascertain the quality of the tested cigarette. If the quality is unsatisfactory, the signal is utilized to ensure segregation of the defective cigarette from satisfactory cigarettes and/or an appropriate adjustment of the cigarette making machine to ensure the making of satisfactory articles.

The end wall 4 of the right-hand end portion 7 of the tubular body 2 yields in response to engagement of its external surface 4a by the end face of the filter plug 8a and in response to further movement of the cigarette 8 in a direction to the left (and/or in response to movement of the tubular body 2 in a direction to the right). Such leftward movement of the end wall 4 relative to the major portion of the tubular body 2 entails a deformation of the lip 9 radially inwardly (as indicated by the arrows 11, i.e., toward the axis of the body 2) whereby the internal surface 9a of the deformed lip 9 sealingly engages the peripheral surface of the filter plug 8a to thus ensure that the testing fluid 10 cannot escape into the surrounding atmosphere (except, of course, through one or more defective portions of the wrapper of the article 8) but is compelled to flow through the opening 6 and into the major portion of the axial passage in the tubular body 2.

In accordance with a feature of the invention, the end portion 7 including the wall 4 and the lip 9 further comprises a novel and improved transition zone 12 between the parts 4 and 9. Thus, the external surface 4a of the end wall 4 is provided with a circumferentially complete recess or groove 13 which is adjacent (preferably closely or immediately adjacent) the internal surface 9a of the lip 9. The illustrated recess 13 has a substantially semicircular cross-sectional outline, and such recess is aligned with the adjacent edge face of the wrapper of the cigarette 4 when the latter is caused to move toward the external surface 4a of the end wall 4 in order to displace the end wall axially of the tubular body 2 and to thus deform the lip 9 radially inwardly as indicated by the arrows 11. The depth of the recess 13 can be a relatively small fraction of the axial length of the lip 9, i.e., small fraction of the distance through which the lip extends beyond the exposed surface 4a of the end wall 4.

The recess 13 can have any one of a number of cross-sectional outlines, i.e., other than that shown in the drawing, without departing from the spirit of the present invention. The same applies for the axial length of the lip 9 and/or for the exact configuration of that portion of the peripheral surface of the tubular body 2 which surrounds the lip. An important advantage of the recess 13 or an equivalent recess in the external surface 4a of the end wall 4 is that the often sharp edge face of the wrapper of an article being tested cannot move into actual contact with the transition zone 12, i.e., with the end wall 4 and/or with the lip 9. This ensures that the useful life of the improved sealing element 1 is longer than that of heretofore known sealing elements. Nevertheless, the lip 9 is capable of adequately (sealingly) engaging the peripheral surface of the adjacent end portion of an article being tested to thus ensure that the testing with air or with any other suitable fluid will result in reliable detection of defective articles but will not entail the ejection of acceptable articles.

As already mentioned above, the sealing element 1 can be utilized in such a way that the opening 6 in the end wall 4 of its end portion 7 constitutes an inlet of the axial passage for the flow of a testing fluid 10, or that such opening constitutes an outlet of the passage, i.e., the testing fluid can flow from the passage into the end of the adjacent article to be tested.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An element for sealingly engaging the ends of rod-shaped articles of the tobacco processing industry during testing of articles with a testing fluid, comprising a substantially tubular body including an end portion having an end wall with an external surface engageable by the end of an article to be tested and an annular lip surrounding and extending beyond said external surface, said body having an elongated fluid conveying passage including at least one opening in said end wall, said end wall being movable into said passage in response to engagement of said external surface by the end of an article to be tested and said lip being deformable toward and into sealing engagement with the end of an article in response to such movement of said end wall, said end portion further having an annular recess provided in said external surface adjacent said lip.

2. The element of claim 1, wherein said at least one opening is disposed substantially centrally of said end wall and is spacedly surrounded by said recess.

3. The element of claim 1, wherein said tubular body is elongated and has a longitudinally extending axis, said end wall being movable in the direction of said axis and said lip being deformable substantially radially of and toward said axis.

4. The element of claim 1, wherein said recess has a substantially semicircular cross-sectional outline.

5. The element of claim 1, wherein said recess has a predetermined depth and said lip extends beyond said external surface through a distance exceeding said predetermined depth.

6. The element of claim 1, wherein at least said lip of said end portion contains an elastic material.

7. The element of claim 6, wherein said elastic material is selected from the group consisting of rubber and elastomers.

8. The element of claim 6, wherein the entire tubular body consists of elastomeric material.

9. The element of claim 1, wherein said at least one opening constitutes an inlet of said passage.

10. The element of claim 1, wherein said at least one opening constitutes an outlet of said passage.

* * * * *